United States Patent
Ichihara (10) Patent No.: US 7,990,827 B2
(45) Date of Patent: Aug. 2, 2011

(54) OPTICAL DISC DEVICE AND OPTICAL DISC DETERMINATION METHOD

(75) Inventor: Kazuo Ichihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 571 days.

(21) Appl. No.: 12/153,061

(22) Filed: May 13, 2008

(65) Prior Publication Data

US 2008/0285425 A1  Nov. 20, 2008

(30) Foreign Application Priority Data

May 15, 2007 (JP) ................................ 2007-128753

(51) Int. Cl.
*G11B 7/00* (2006.01)
(52) U.S. Cl. ............... 369/53.23; 369/53.28; 369/44.25; 369/44.28
(58) Field of Classification Search .................. None
See application file for complete search history.

(56) References Cited

U.S. PATENT DOCUMENTS

2005/0276199 A1  12/2005  Sugai ................. 369/53.22

FOREIGN PATENT DOCUMENTS

| JP | 04-011325 | 1/1992 |
|---|---|---|
| JP | 2004-171614 | 6/2004 |
| JP | 2004-206765 | 7/2004 |
| JP | 2005-259252 | 9/2005 |
| JP | 2005-353142 | 12/2005 |

*Primary Examiner* — Muhammad N. Edun (74) *Attorney, Agent, or Firm* — Morgan Lewis & Bockius LLP (57) ABSTRACT

An optical disc device includes a control part for causing processing of determining a type of an optical disc to be executed. The processing caused by the control part to be executed for determining the optical disc includes: signal acquisition processing of acquiring a pull-in signal (sum signal of reflected signal) and an RF signal (reproduced signal) by moving an objective lens in either of a direction approaching the optical disc and a direction separating from the optical disc; and determination processing of deciding whether or not to correct the pull-in signal acquired in the signal acquisition processing and determining the type of the optical disc by using either of amplitude of the acquired pull-in signal and a correction value with which the amplitude of the acquired pull-in signal is corrected by using a predetermined value obtained from the acquired RF signal.

17 Claims, 7 Drawing Sheets

OPTICAL DISC DEVICE AND OPTICAL DISC DETERMINATION METHOD

This application is based on Japanese Patent Application No. 2007-128753 filed on May 15, 2007, the contents of which are hereby incorporated by reference.

BACKGROUND OF THE INVENTION

1. Field of the Invention

The present invention relates to an optical disc device for performing reproduction from and/or recording on an optical disc. The invention also relates to an optical disc determination method of determining a type of an optical disc.

2. Description of Related Art

Optical discs such as a compact disc (hereinafter referred to as CD) and a digital versatile disc (hereinafter referred to as DVD) have been in widespread use. Moreover, in recent years, in order to increase the information volume of an optical disc, studies on high-density recording on an optical disc have been advanced, and optical discs, such as a blue-ray disc (hereinafter referred to as BD), that are capable of recording a large volume of information have been put into practical use.

Information recording and reproduction on and from an optical disc are performed in an optical disc device. Since there are a plurality of types of optical discs as described above, in view of convenience, etc., optical disc devices capable of performing alone information recording and reproduction on and from a plurality of types of optical discs have become widespread. Typically, in such optical disc devices, when an optical disc is inserted into the device, a type of the optical disc is first determined, the device is set in condition in accordance with a corresponding optical disc based on a determination result, and then recording and reproduction are performed on and from the optical disc.

A large number of methods of determining a type of an optical disc in an optical disc device capable of performing information recording and reproduction on and from a plurality of optical discs have been conventionally reported. For example, Patent Document 1 suggests a method of determining a type of an optical disc by determining the recording density of the optical disc based on an RF signal. In addition, Patent Document 2 suggests another method of determining a type of an optical disc by generating a focus signal based on an RF signal.

As a method different from such methods of determining a type of an optical disc by using an RF signal, for example, an optical disc determination method as indicated in Patent Document 3 has been suggested. In the optical disc determination method of Patent Document 3, first based on a pull-in signal, a time length from detection of surface reflection on the optical disc surface to detection of recording layer reflection on a recording layer is measured to roughly classify a type of an optical disc. For example, between a CD and a DVD, due to a difference in the thickness of a transparent cover layer (for example, 1.2 mm for the CD and 0.6 mm for the DVD), the time length from the detection of the surface reflection to the detection of the recording layer reflection differs. Therefore, the measurement of this time length permits roughly classifying the type of the optical disc as a CD-type or a DVD-type. Then after the type of the optical disc is roughly classified, a peak value of a focus error signal is measured, and based on this peak value, detailed determination of the optical disc (for example, determination on whether a CD-type optical disc is a CD-ROM, a CD-R, or a CD-RW) is performed.

Patent Document 3 suggests a technique intended to reduce the time required for disc type determination processing upon determination of the type of the optical disc with such a method.

As described above, various optical disc determination methods have been conventionally suggested. For the purpose of improved accuracy in determining a type of an optical disc, the inventor considers roughly classifying a type of the an optical disc by using a pull-in signal (PI signal) as a sum signal of reflected light and then determining a type of the optical disc by using amplitude of the PI signal in addition to amplitude of a focus error signal (FE signal).

Different types of optical discs are designed to have different reflectance. Detecting the amplitude of the PI signal as a sum signal of reflected light permits determining the type of the optical disc.

However, in determining the type of the optical disc by use of the amplitude of the PI signal, the type of the optical disc is erroneously determined in some cases particularly for an optical disc with low reflectance. Discs including a BD pigment change type (BD-R) and a BD phase change type (BD-RE) have low reflectance, and thus this erroneous determination is likely to occur in such discs, which is problematic.

Figure 9A:
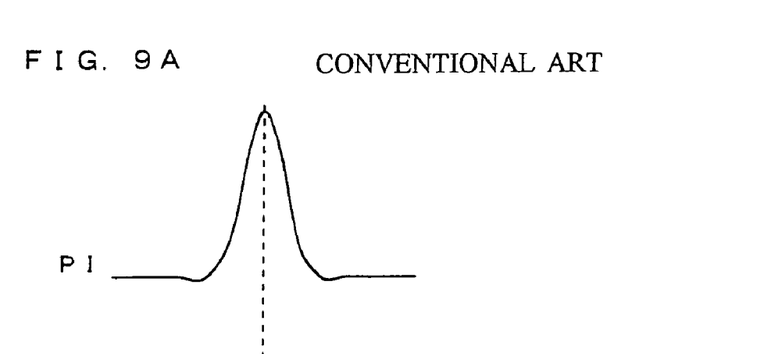
FIG. 9A is a diagram illustrating a conventional problem, referring to a PI signal obtained when an objective lens is moved in a direction approaching the optical disc.
Figure 9B:
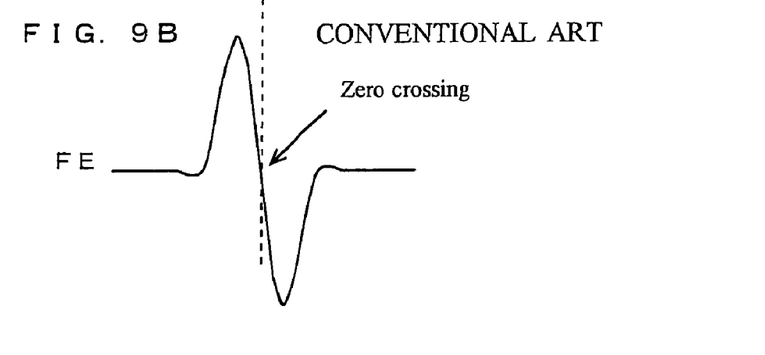
FIG. 9B is a diagram illustrating a conventional problem, referring to an FE signal obtained when the objective lens is moved in the direction approaching the optical disc.

Review by the inventor in this regard has found the following points. When an objective lens is moved in, for example, a direction approaching the optical disc to determine a type of an optical disc, as shown in FIGS. 9A and 9B, a PI signal is obtained which indicates a peak at a zero crossing position of an S-shaped curve of an FE signal. FIGS. 9A and 9B are illustrative diagrams illustrating a signal obtained when the objective lens is moved in the direction approaching the optical disc. FIG. 9A shows the PI signal, and FIG. 9B shows the FE signal.

Figure 10:
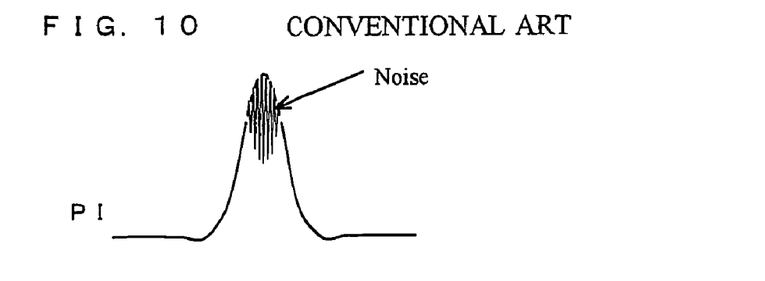
FIG. 10 is a diagram illustrating a conventional problem, showing how noise is generated in the PI signal.

Observation of this PI signal showed that, when information is recorded on the optical disc, for example, a noise component as shown in FIG. 10 is generated near the peak of the PI signal. This proves that, since the reflectance on a recording layer of the optical disc changes when information is recorded onto the optical disc, as is the case with the PI signal as the sum signal of reflected light, an RF signal generated from the sum signal of reflected light is superimposed on the PI signal, which causes a noise.

Figure 11:
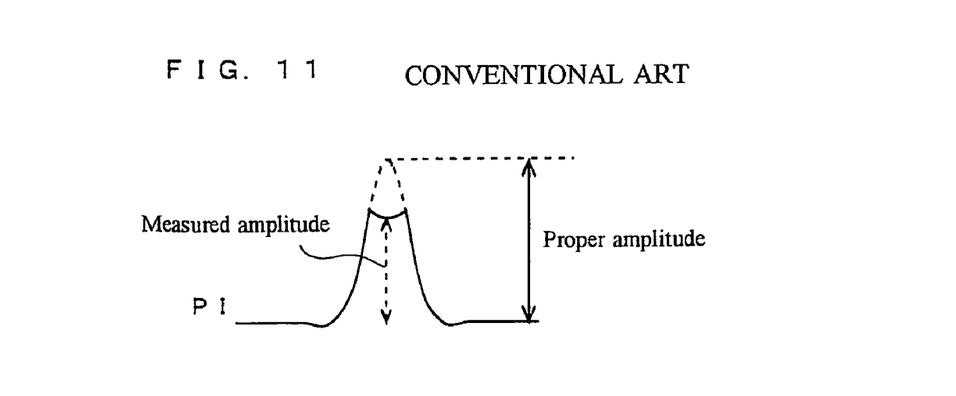
FIG. 11 is a pattern diagram illustrating a conventional problem, illustrating condition in which noise is generated in the PI signal, resulting in erroneous determination.

It is assumed that when the RF signal is superimposed on the PI signal as described above, the type of the optical disc is erroneously determined for following reasons. Specifically, the amplitude of the PI signal is detected after the PI signal is subjected to A/D conversion and then loaded into a processor such as a CPU; therefore, the PI signal may be erroneously recognized as, for example, a signal as shown in FIG. 11 depending on sampling condition of the PI signal. As a result, the amplitude of the PI signal is judged to be low, resulting in erroneous optical disc determination. Then this erroneous determination is likely to occur particularly in an optical disc with low reflectance.

Conventionally, it has never been reported that there is a problem as described above involved in determining a type of an optical disc by use of a PI signal and also a way of resolving this problem has never been reported.

[Patent Document 1] JP-A-2005-353142
[Patent Document 2] JP-A-2004-206765
[Patent Document 3] JP-A-2005-259252

SUMMARY OF THE INVENTION

In view of the aforementioned points, it is an object of the present invention to provide an optical disc device capable of highly accurately determining a type of an optical disc with low reflectance and also performing information recording and/or reproduction in a stable manner. It is another object of the invention to provide an optical disc determination method capable of highly accurately determining a type of an optical disc with low reflectance and also reducing erroneous optical disc determination.

To achieve the object described above, according to one aspect of the invention, an optical disc device includes: a light source; an objective lens condensing on a recording layer of an optical disc an optical beam emitted from the light source; an actuator displacing the objective lens in a direction approaching or separating from the optical disc; an optical detection part receiving reflected light reflected by the optical disc; a pull-in signal generation part generating a pull-in signal as a sum signal of the reflected light from an electrical signal detected by the optical detection part; an RF signal generation part generating an RF signal as a reproduced signal from the electrical signal detected by the optical detection part; and a control part causing processing of determining a type of the optical disc to be executed. Then the processing caused by the control part to be executed includes: signal acquisition processing moving the objective lens in either of the direction approaching the optical disc or the direction separating from the optical disc to acquire the pull-in signal and the RF signal; and determination processing deciding, based on the RF signal acquired in the signal acquisition processing, whether or not to correct amplitude of the pull-in signal acquired in the signal acquisition processing, and then determining the type of the optical disc by using either of: the amplitude of the acquired pull-in signal and a correction value with which the amplitude of the acquired pull-in signal is corrected by using a predetermined value obtained from the acquired RF signal.

With this configuration, the amplitude of the pull-in signal as a sum signal of reflected light is appropriately corrected, which reduces the possibility of erroneous determination in determining the type of the optical disc by using the amplitude of the pull-in signal (the one corrected in some cases). Therefore, an optical disc device can be provided which is capable of highly accurately determining the type of an optical disc with low reflectance and also performing information recording and/or reproduction in a stable manner.

In the optical disc device with the configuration described above, the predetermined value obtained from the RF signal may be a value obtained as a difference between a maximum value and a minimum value of the RF signal obtained by the signal acquisition processing. This makes it possible to correct the pull-in signal with a low possibility of error occurrence, which permits further reducing the possibility of erroneous determination of the optical disc.

In the optical disc device with the configuration described above, the processing caused by the control part to be executed may include rough classification processing of measuring time from when reflection on a surface of the optical disc is detected to when reflection on the recording layer is detected and then roughly classifying the type of the optical disc based on obtained time information, and the determination processing may be executed after the rough classification processing. With such configuration, the optical disc can be determined with high accuracy.

In the optical disc device with the configuration described above, a focus error signal may be further acquired in the signal acquisition processing, and the processing caused by the control part to be executed may include processing of determining the type of the optical disc based on amplitude of the focus error signal. With such configuration, the possibility of erroneous determination in determining the optical disc can be further reduced.

In the optical disc device with the configuration described above, the determination processing is preferably used for determining at least a type of an optical disc of a blue-ray disc type. Of optical discs of a blue-ray disc (BD) type, the optical discs of a pigment change type (BD-R) and a phase change type (BD-RE) in particular have low reflectance, and thus are more likely to encounter erroneous determination. Thus, the configuration of the invention is expected to be effective in reducing the erroneous determination.

To achieve the object described above, according to another aspect of the invention, a method of determining a type of an optical disc by using amplitude of a pull-in signal as a sum signal of reflected light from the optical disc includes the steps of: acquiring the pull-in signal and an RF signal as a reproduced signal by moving an objective lens in either of a direction approaching the optical disc and a direction separating from the optical disc; deciding, based on the acquired RF signal, whether or not to correct amplitude of the acquired pull-in signal; and determining the type of the optical disc by using either of the amplitude of the acquired pull-in signal and a correction value with which the amplitude of the acquired pull-in signal is corrected by using a predetermined value obtained from the acquired RF signal.

With this configuration, the amplitude of the pull-in signal as a sum signal of reflected light is appropriately corrected, which reduces the possibility of erroneous determination occurring in determining the type of the optical disc by using the amplitude (corrected one in some cases) of the pull-in signal. Therefore, an optical disc determination method can be provided which can highly accurately determine the type of an optical disc with low reflectance and can reduce the possibility of erroneous determination.

DETAILED DESCRIPTION OF THE PREFERRED EMBODIMENTS

Hereinafter, details of the present invention will be described, with reference to the accompanying drawings. Note that, however, the embodiment presented here is just one example, and thus the invention is not limited to the embodiment presented here.

Figure 1:
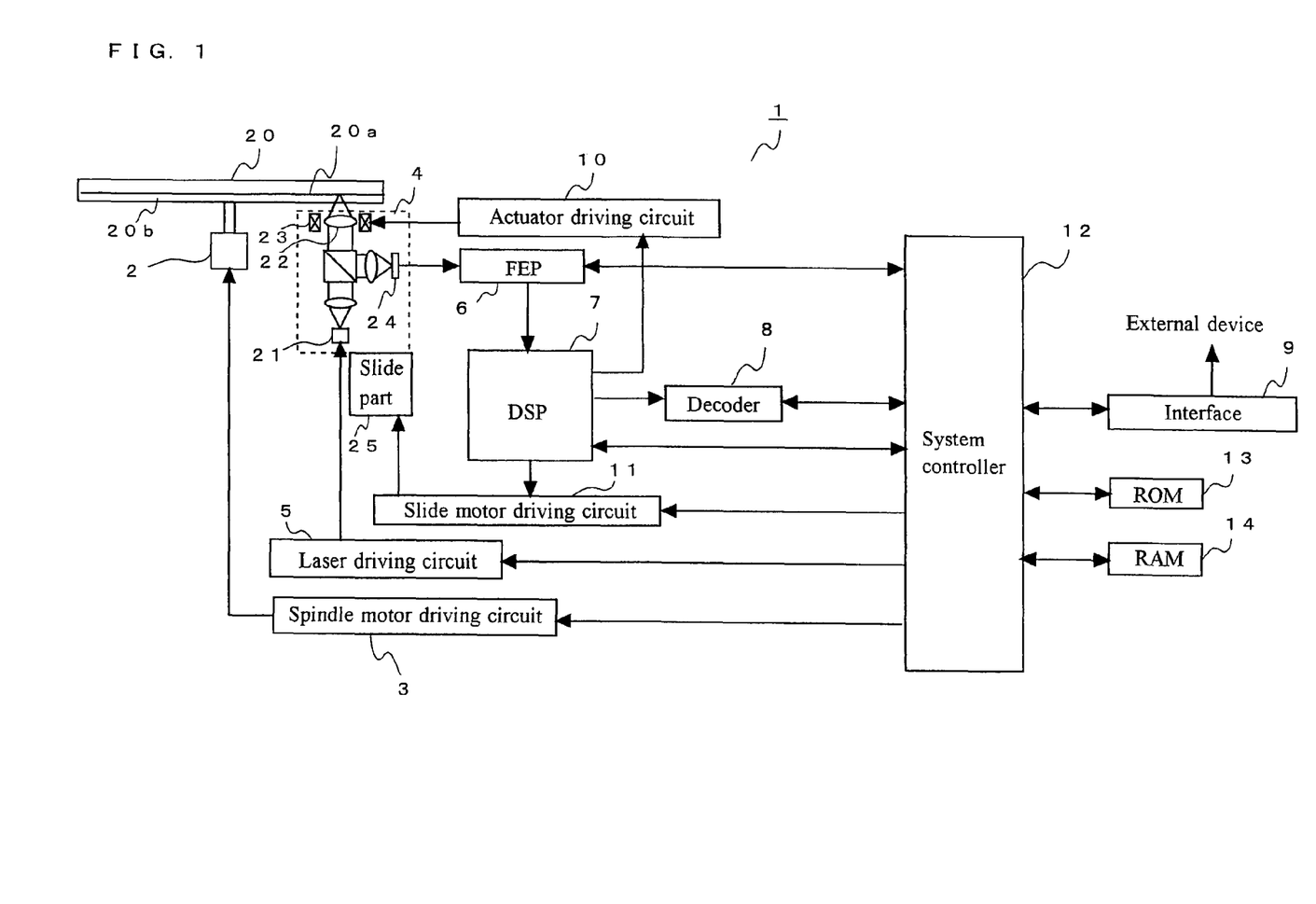
FIG. 1 is a block diagram showing configuration of an optical disc device of this embodiment.

First, configuration of an optical disc device of this embodiment will be described, referring to FIG. 1. FIG. 1 is a block diagram showing the configuration of the optical disc device of this embodiment. The optical disc device 1 of this embodiment is so provided as to be capable of reproducing information from an optical disc 20 and recording information onto the optical disc 20, and is compatible with a BD-type, a DVD-type, and a CD-type optical discs.

The BD-type optical discs include: for example, a BD-ROM, a BD-R, and a BD-RE. The DVD-type optical discs include: for example, a DVD-ROM, a DVD±R, and a DVD±RW. The CD-type optical discs include: for example, a CD-ROM, a CD-R, and a CD-RW.

Numeral 2 denotes a spindle motor. The optical disc 20 is removably held at a chuck part (not shown) provided on the top of the spindle motor 2. The spindle motor 2 continuously rotates the optical disc 20 at the time of, for example, information recording and reproduction on and from the optical disc 20 or determining a type of the optical disc 20. The rotation of the spindle motor 2 is controlled by a spindle motor driving circuit 3.

Figure 2:
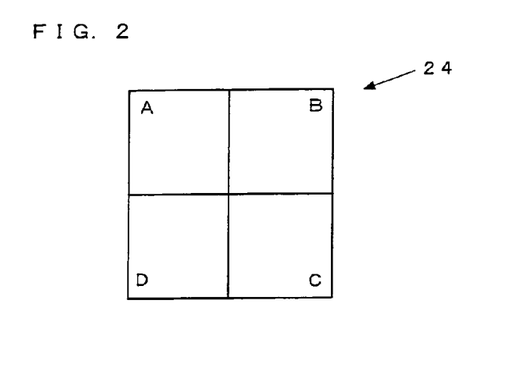
FIG. 2 is a schematic plan view showing configuration of a light receiving region of an optical detector included in the optical disc device of this embodiment.

Numeral 4 denotes an optical pickup. The optical pickup 4 irradiates the optical disc 20 with laser light emitted from a light source 21 to permit writing information onto the optical disc 20 and reading information recorded on the optical disc 20. As shown in FIG. 1, the optical pickup 4 includes: the light source 21; an objective lens 22 condensing the laser light emitted from the light source on a recording layer 20a of the optical disc 20; an actuator 23 moving the objective lens 22 in a focus direction, i.e., a direction parallel to an optical axis direction, and in a trucking direction, i.e., a direction parallel to a radial direction of the optical disc 20; and an optical detector 24 receiving reflected light reflected on the optical disc 20 and converting it into an electric signal. As shown in FIG. 2, the optical detector 24 includes four divided light receiving regions.

The optical disc device 1 of this embodiment is compatible with a BD-type, a DVD-type, and a CD-type optical discs as described above. The light source 21 is capable of emitting laser light for a BD (for example, with a wavelength of 405 nm), a DVD (for example, with a wavelength of 650 nm), and a CD (for example, with a wavelength of 780 nm).

The optical pickup 4 can be moved in the radial direction of the optical disc 20 by driving of a slide part 25. Upon information recording and reproduction by the optical disc device 1, the optical pickup 4 performs information reading and writing while moving in the radial direction of the optical disc 20.

A laser driving circuit 5, for the laser light emitted from the light source 21 included in the optical pickup 4, controls laser power based on the amount of light received by a light receiving element for a front monitor (not shown), and controls switching to emission of laser light of a different wavelength.

An FEP (front end processor) 6 is fed with an electric signal from the optical detector 24 included in the optical pickup 4, and processes the fed electric signal to generate an RF signal, a pull-in signal (PI signal), a focus error signal (FE signal), a trucking error signal (TE signal), etc.

A DSP (digital signal processor) 7 performs AD conversion on the RF signal fed from the FEP 6, reads information recorded on the optical disc 20, and transmits the read information to a decoder 8. The decoder 8 demodulates data and also detects data error, and when it has detected data error, performs data correction processing if possible. Reproduced data obtained by the decoder 8 is outputted to an external device, such as a personal computer, via an interface 9. The decoder 8 also plays a role in feeding to a system controller 12 an error rate as an occurrence rate of data reading error.

The DSP 7 is provided with a function of a servo controller circuit. The DSP 7 outputs control signals in order to perform focus servo and trucking servo of the optical pickup 4 and servo of a slide motor driving the slide part 25 by using the FE signal and TE signal outputted from the FEP 6 under the control of the system controller 12. Moreover, the DSP 7 performs various processing in order to determine the optical disc 20 inserted in the optical disc device 1, which will be described later on.

An actuator driving circuit 10, by using the focus servo control signal outputted from the servo controller circuit of the DSP 7, drives the actuator 23 of the optical pickup 4 so that a focal point of the objective lens 22 of the optical pickup 4 always lies on the recording layer 20a of the optical disc 20. The actuator driving circuit 10 also, by using the trucking servo control signal, drives the actuator 23 of the optical pickup 4 so that laser light emitted from the light source 21 of the optical pickup 4 always traces a truck of the optical disc 20. Moreover, the actuator driving circuit 10 moves the objective lens 22 at the time of determining the type of the optical disc 20, which will be described later on.

A slide motor driving circuit 11, by using the control signal outputted from the DSP 7 for performing the servo of the slide motor, drives the slide motor included in the slide part 25 so that laser light emitted from the optical pickup 4 traces a predetermined truck of the optical disc 20.

The system controller 12 includes a microcomputer, and executes control processing as appropriate in accordance with required operation to be executed by the various parts forming the optical disc device 1. In addition, the system controller 12 also functions as a control part causing processing of determining the type of the optical disc 20 to be executed. The operation of determining the optical disc 20 will be described later on. In this embodiment, the system controller 12 is configured to cause processing of determining the type of the optical disc 20 to be executed, although its configuration is not limited to this. Thus, for example, configuration such that a control part for causing processing of determining the type of the optical disc 20 to be executed is provided apart form the system controller 12 may be provided.

The system controller 12 is provided with a ROM (Read Only Memory) 13 and a RAM (Random Access Memory) 14. The ROM 13 stores various parameters and operation programs required for the system controller 12 to perform various processing. The RAM 14 is used as a region for work by the system controller 12, and also provided as a region for storing various required information.

Figure 3:
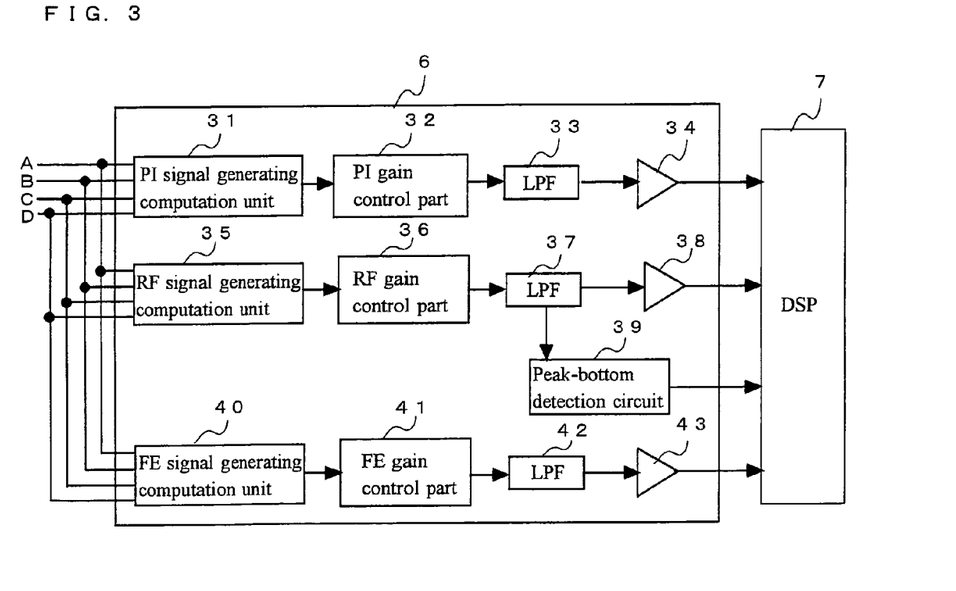
FIG. 3 is a block diagram showing portions involved in determining a type of an optical disc in an FEP included in the optical disc device of this embodiment.

Next, determining the type of the optical disc 20 in the optical disc device 1 will be described. FIG. 3 is a block diagram showing portions involved in determining the type of the optical disc 20 in the FEP 6 included in the optical disc device 1. Referring to FIG. 3, a flow of generating and processing a PI signal, an RF signal, and an FE signal used in the processing of determining the optical disc 20 will be described.

Electrical signals obtained by receiving reflected light by the four light receiving regions A to D (see FIG. 2) included in the optical detector 24 are each transmitted to a PI signal generating computation unit 31, an RF signal generating computation unit 35, and an FE signal generating computation unit 40. The PI signal generating computation unit 31 adds together all the signals (A+B+C+D) transmitted from the four light receiving regions A to D included in the optical detector 24.

A signal obtained by this addition is transmitted to a PI gain control part 32. The PI gain control part 32 makes gain adjustment to facilitate processing in later stages, and an LPF (low-pass filter) 33 eliminates noise. A buffer amplifier 34 adjusts a signal level for signal passage from the FEP 6 to the DSP 7. A PI signal obtained in this manner is fed to the DSP 7.

The RF signal generating computation unit 35 adds together all the signals (A+B+C+D) transmitted from the four light receiving regions A to D included in the optical detector 24. A signal obtained by this addition is transmitted to an RF gain control part 36. The RF gain control part 36 makes gain adjustment to facilitate processing in later stages, and an LPF (low-pass filter) 37 eliminates noise. A buffer amplifier 38 adjusts a signal level for signal passage from the FEP 6 to the DSP 7. An RF signal obtained in this manner is fed to the DSP 7.

Figure 4:
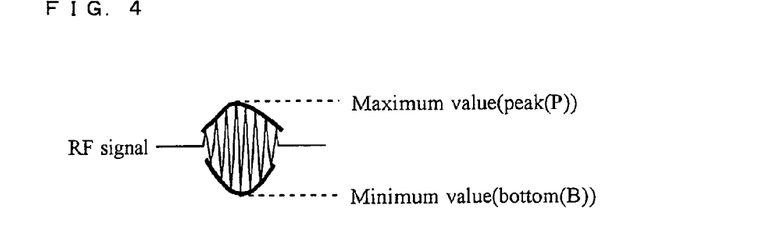
FIG. 4 is an image diagram illustrating maximum and minimum values of an RF signal.

The signal obtained by the RF signal generating computation unit 35 is subjected to, in addition to processing of simply acquiring an RF signal, processing for obtaining maximum and minimum values of an RF signal as shown in FIG. 4. Specifically, the RF signal obtained through the processing by the RF gain control part 36 and the LPF 37 is transmitted to peak-bottom detection circuits 39. Of the peak-bottom detection circuits 39, a peak detection circuit holds only the maximum value of the RF signal within measurement time, and the bottom detection circuit holds only the minimum value of the RF signal within the measurement time. Consequently, the maximum and minimum values of the RF signal as shown in FIG. 4 can be obtained.

FIG. 4 is an image diagram illustrating the maximum and minimum values of the RI signal. In addition, the maximum and minimum values of the RF signal obtained here are hereinafter expressed as a peak (P) and a bottom (B) of the RF signal, respectively. The acquired peak and bottom of the RI signal are transmitted to the DSP 7.

An FE signal generating computation unit 40 computes the signals transmitted from the four light receiving regions A to D included in the optical detector 24 ((A+C)-(B+D)), and transmits it to an FE gain control part 41. The FE gain control part 41 makes gain adjustment to facilitate processing in later stages, and an LPF (low-pass filter) 42 eliminates noise. A buffer amplifier 43 adjusts a signal level for signal passage from the FEP 6 to the DSP 7. An FE signal obtained in this manner is fed to the DSP 7.

The DSP 7 performs various processing for the PI signal, the RF signal, the FE signal, and the peak and the bottom of the RF signal fed from the DSP 7, and transmits results of this processing to the system controller 12 (see FIG. 1). Then the system controller 12 determines the type of the optical disc 20 based on the results of processing transmitted from the DSP 7.

Figure 5:
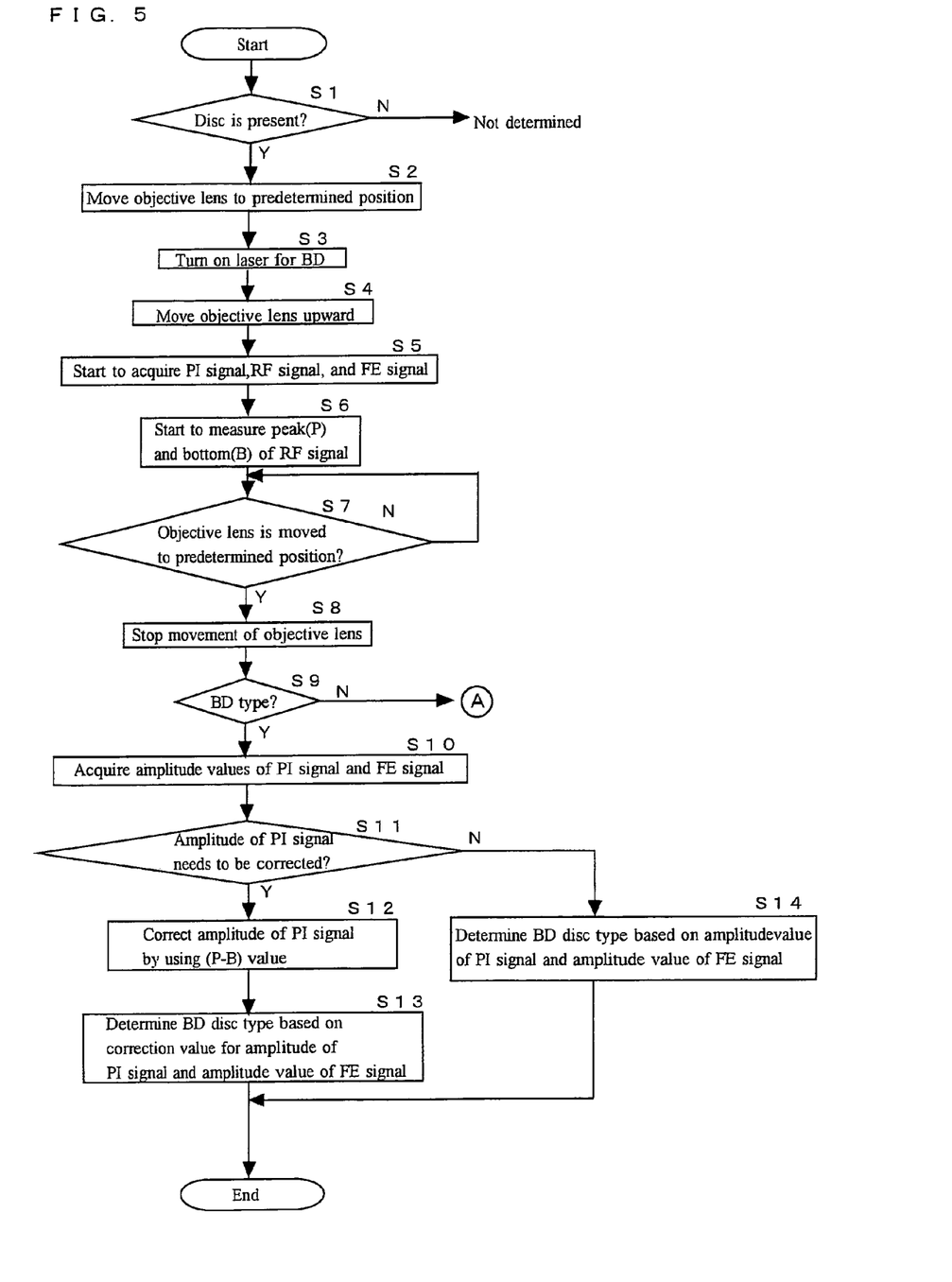
FIG. 5 is a flowchart partially showing procedures of determining an optical disc by the optical disc device of this embodiment, mainly showing procedures of determining a BD-type optical disc.
Figure 6:
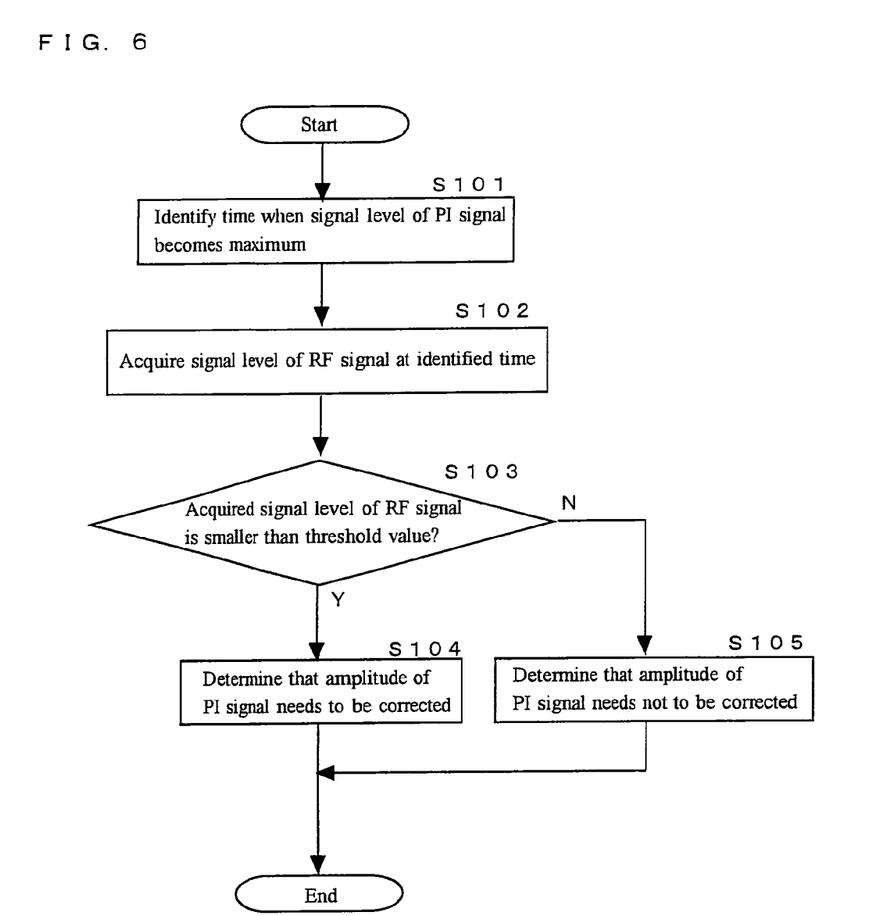
FIG. 6 is a flowchart illustrating in detail part of the flowchart shown in FIG. 5.
Figure 7:
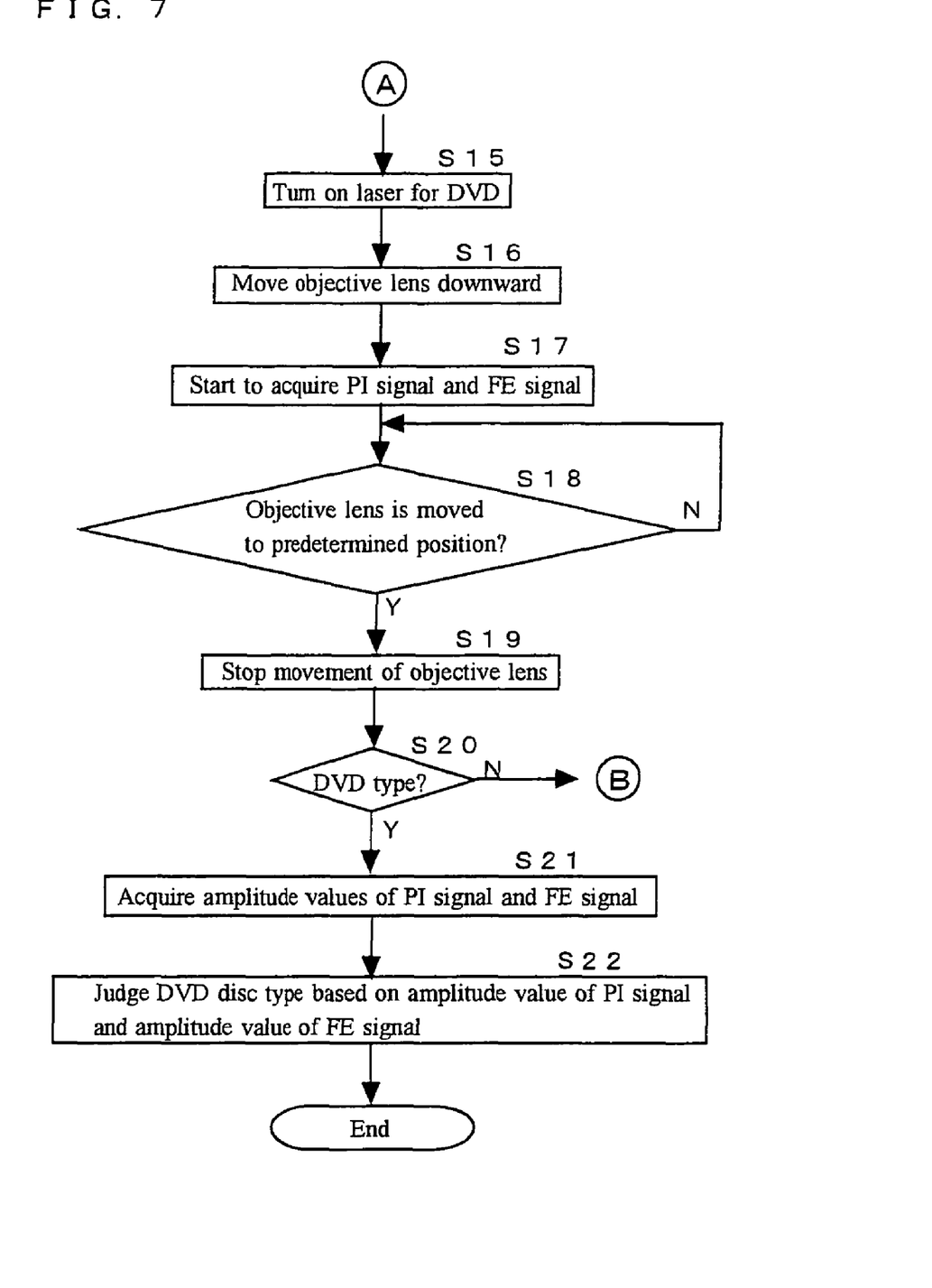
FIG. 7 is a flowchart partially showing procedures of determining an optical disc by the optical disc device of this embodiment, mainly showing procedures of determining a DVD-type optical disc.
Figure 8:
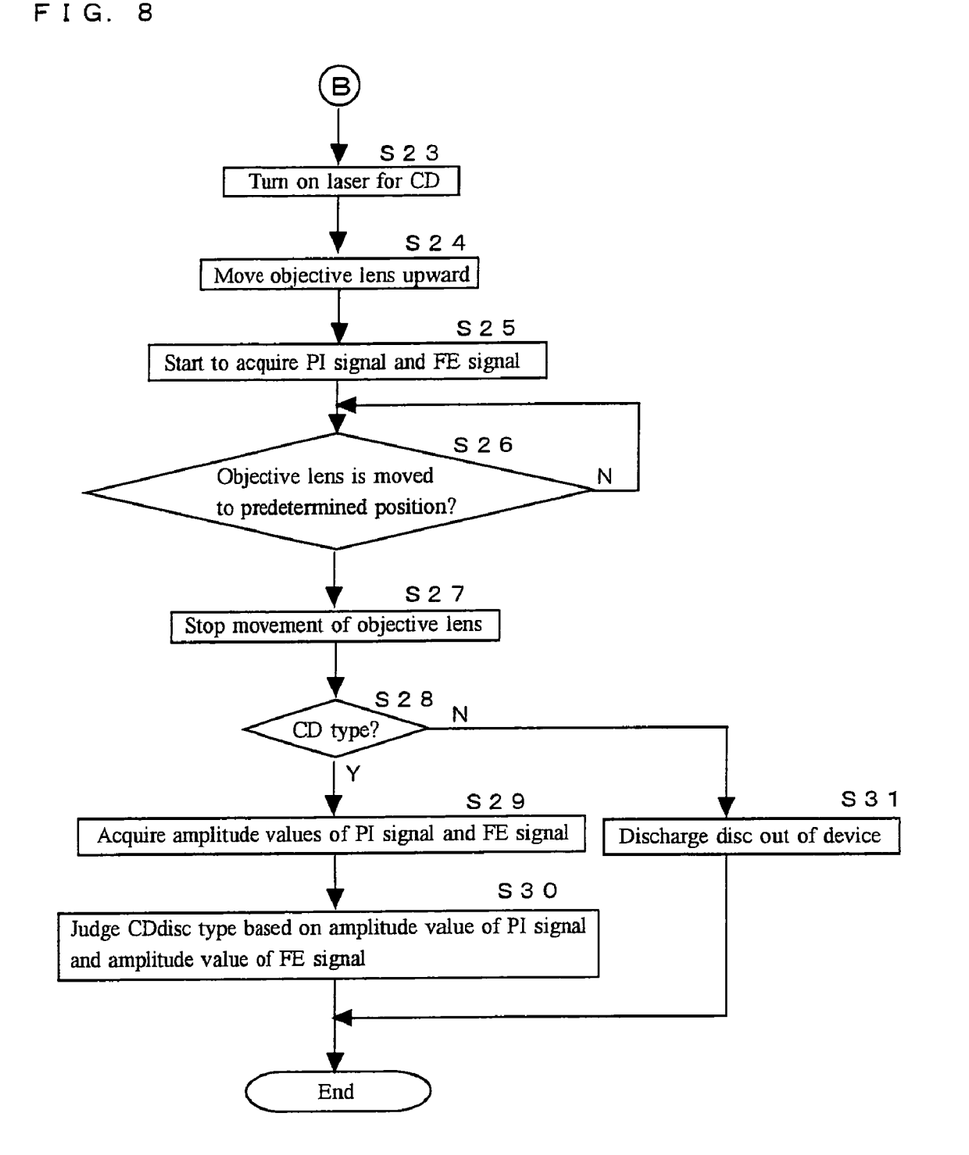
FIG. 8 is a flowchart partially showing procedures of determining an optical disc by the optical disc device of this embodiment, mainly showing procedures of determining a CD-type optical disc.

Hereinafter, procedures of determining the type of the optical disc 20 in the optical disc device 1 will be described, referring to FIGS. 5 to 8. FIG. 5 is a flowchart partially showing procedures of determining the optical disc by the optical disc device 1 of this embodiment, mainly showing procedures of determining a BD-type optical disc. FIG. 6 is a flowchart illustrating in detail part of the flowchart shown in FIG. 5. FIG. 7 is a flowchart partially showing procedures of determining the optical disc by the optical disc device 1 of this embodiment, mainly showing procedures of determining a DVD-type optical disc. FIG. 8 is a flowchart partially showing procedures of determining the optical disc by the optical disc device 1 of this embodiment, mainly showing procedures of determining a CD-type optical disc.

First, a description will be given, referring to FIG. 5. In the optical disc device 1, the determination of the optical disc 20 is performed based on a command from the system controller 12. First, it is checked if the optical disc 20 is present in the device (step S1). The presence/absence of this optical disc 20 is checked by, for example, using FG (Frequency generator) pulses obtained when the spindle motor 2 is slightly operated. The number of FG pulses observed differs between the presence and absence of the optical disc 20, which permits judging the presence/absence of the optical disc 20.

If the optical disc 20 is not present in the device, the determination of the optical disc 20 is not performed. If it is judged that the optical disc 20 is present in the device, the objective lens 22 is moved to a predetermined position (step S2). In this embodiment, as described later on, due to configuration such that the objective lens 22 is first moved in a direction approaching the optical disc 20 to obtain a PI signal, an RF signal, and an FE signal, the objective lens 22 is moved in a direction separating from the optical disc 20 by a predetermined degree.

When the objective lens 22 has been moved to the predetermined position, the light source 21 for a BD is turned on (step S3). Thereafter, the objective lens 22 is moved in the direction approaching the optical disc 20 (upward direction) (step S4). In addition, simultaneously with the upward movement of the objective lens 22, acquisition of the PI signal, the RF signal, and the FE signal is started (step S5). Moreover, simultaneously with the acquisition of the RF signal, measurement of a peak and a bottom of the RF signal is started (step S6).

Thereafter, it is checked if the objective lens 22 has moved to the predetermined position (step S7). Until the objective lens 22 moves to the predetermined position, the acquisition of the PI signal, etc. and the measurement of the beam and bottom of the RF signal are continued. When the objective lens 22 has moved to the predetermined position, the movement of the objective lens 22 is stopped (step S8), and it is checked if the optical disc 20 inserted in the device is a BD-type optical disc 20 (step S9).

This check is performed by using, for example, the PI signal in the following manner. Specifically, when the objective lens 22 moves in the direction approaching the optical disc 20, the peak of the PI signal is first observed following surface reflection on the optical disc 20, and then the peak of the PI signal is observed following reflection on the recording layer 20a (recording layer reflection) of the optical disc 20. Therefore, for example, measuring time from when the peak of the PI signal by the surface reflection is obtained to when the peak thereof by the recording layer reflection is obtained permits recognition of a distance from the surface of the optical disc 20 to the recording layer 20a thereof. Then since the thickness of a transparent cover layer 20b (see FIG. 1) protecting the recording layer 20a is different among a BD-type, a DVD-type, and a CD-type (for example, 0.1 mm for the BD-type, 0.6 mm for the DVD-type, and 1.2 mm for the CD type), measuring this time length permits checking if the optical disc 20 is of the BD-type.

A case where it is judged in step S9 that the optical disc 20 in the device is not of a BD-type will be described later on. In step S9, if it is judged that the optical disc 20 in the device is of a BD type, it is determined through the following processing whether the optical disc 20 is a BD-ROM, BD-R, or BD-RE.

Their optical discs 20 have different reflectance on the recording layer 20*a,* and thus the determination can be achieved by using amplitude of the PI signal and FE signal previously acquired (amplitude of a signal curve originating from the recording layer 20*a*). The amplitude of the PI signal and the FE signal is acquired by the DSP 7 to which the PI signal and the FE signal are fed. However, as described above, since the PI signal and the RF signal are superimposed on each other, the determination of the optical disc 20 by the amplitude of the PI signal possibly results in erroneous determination. Hereinafter, procedures of determining the optical disc 20 while not causing this erroneous determination will be described.

If it is judged that the optical disc is of a BD-type, the amplitude of the PI signal and the FE signal (that of a signal curve based on recording layer reflection of the BD) is acquired (step S10). The amplitude is obtained through processing by the DSP 7, and this is transmitted to the system controller 12. Next, it is checked if the amplitude of the PI signal needs to be corrected (step S11). Procedures of this check will be described, referring to FIG. 6.

First, time when a signal level of the PI signal based on the recording layer reflection of the BD becomes maximum is checked (step S101). This time can be obtained by, for example, starting time measurement simultaneously with the start of obtaining the PI signal, etc. (step S5 in FIG. 5) and also collecting data on this time. In this embodiment, the amplitude of the PI signal described above is obtained based on the position where the signal level of the PI signal becomes maximum.

Next, the signal level of the RF signal at the time identified is acquired (step S102). This processing is performed in the DSP 7, and the acquired signal level of the RF signal is transmitted to the system controller 12. Then the system controller 12 checks if the acquired signal level of the RF signal is smaller than a previously defined threshold value (step S103).

Here, if the signal level of the RF signal is smaller than the threshold value, it is judged that the amplitude of the PI signal previously acquired is extremely smaller than its original value due to the superimposition of the RF signal (that is, it is judged that the type of the optical disc 20 is possibly determined erroneously). Thus, the system controller 12 decides that the amplitude of the PI signal needs to be corrected (step S104). On the other hand, if the signal level of the RF signal is equal to or larger than the threshold value, it is judged that the amplitude of the PI signal previously acquired is close to its original value, and determines that the amplitude of the PI signal needs not to be corrected (step S105).

It is assumed above that the reflectance drops at a portion of the optical disc 20 where information is recorded and the acquired level of the RF signal at this portion drops. Moreover, an appropriate value as the threshold value to be used for judging whether or not to correct the PI signal may be decided by previously performing an experiment.

In addition, in a case where no information is recorded in the optical disc 20, a drop in the reflectance caused by information recording does not occur, so that the amplitude of the PI signal does not become smaller than its original value as a result of the superimposition of the PI signal and the RF signal on each other. Also in this case, it can be judged through the flow shown in FIG. 6 whether the amplitude of the PI signal needs to be corrected. However, as another embodiment, it can be judged whether or not information is previously recorded on the optical disc 20, and if information has not yet been recorded, it may be judged that the amplitude of the PI signal needs not to be corrected, and if information has been recorded, steps S101 to S105 shown in FIG. 6 may be executed.

For the judgment on whether or not information is recorded on the optical disc 20, for example, a binary signal obtained based on the RF signal can be used. Specifically, the binary signal is a signal obtained by preparing a threshold value that enables distinction between recording and non-recording and then converting the RF signal in accordance with this threshold value.

Turning back to FIG. 5, if it is judged in step S11 that the amplitude of the PI signal needs to be corrected, the maximum value (peak (P)) and minimum value (bottom (B)) of the RF signal are subjected to computation processing (P−B) and this is used for level addition to the amplitude of the PI signal to thereby obtain a correction value of the PI signal (step S12).

The configuration of this embodiment such that the value (P−B) obtained as a difference between the maximum and minimum values of the RF signal is used upon the correction of the amplitude of the PI signal is provided in order not to include an error in the amplitude (correction value) of the PI signal obtained by the correction. For example, by the signal level of the RF signal obtained in step S102 of FIG. 6, the amplitude of the PI signal can also be corrected, although this case is susceptible to variation in the RF signal measurement, so that the correction value is likely to be inaccurate.

When the correction value for the amplitude of the PI signal is obtained, based on this correction value and an amplitude value of the FE signal, it is determined whether the BD-type optical disc 20 is a BD-ROM, a BD-R, or a BD-RE (step S13). This determination may be achieved by previously preparing a threshold value and making comparison with this threshold value.

On the other hand, if it is judged in step S11 that the amplitude of the PI signal needs not to be corrected, it is determined by using the amplitude values of the PI signal and the FE signal acquired in step S10 whether the BD-type optical disc 20 is a BD-ROM, a BE-R, or a BD-RE (step S14).

The determination of the optical disc 20 when the optical disc 20 is roughly classified as a BD-type optical disc in step S9 is as described above. If the optical disc 20 is judged not to be of a BD-type in step S9, the determination of the optical disc 20 is performed in the following procedures.

Hereinafter, a description will be given, referring to FIG. 7. First, the light source 21 for a DVD is turned on (step S15). Thereafter, the objective lens 22 is moved in a direction separating from the optical disc 20 (downward direction) (step S16). Simultaneously with the downward movement of the objective lens 22, acquisition of a PI signal and an FE signal is started (step S17).

Thereafter, it is checked if the objective lens 22 has moved to a predetermined position (step S18). Until the objective lens 22 moves to the predetermined position, the acquisition of the PI signal, etc. is continued. When the objective lens 22 has moved to the predetermined position, the movement of the objective lens 22 is stopped (step S19), and it is checked if the optical disc 20 inserted in the device is a DVD-type optical disc 20 (step S20). This check may be achieved in the same manner as the procedures for roughly classifying whether the optical disc 20 is a BD-type optical disc 20.

A case where it is judged in step S20 that the optical disc 20 in the device is not of a DVD type will be described later on. If it is judged in step S20 that the optical disc 20 in the device is of a DVD type, the amplitude of the PI signal and the FE signal (that of a signal curve based on recording layer reflection of the DVD) is acquired (step S21). The amplitude is obtained through processing by the DSP 7, and is transmitted to the system controller 12.

Then by using the acquired amplitude values of the PI signal and the FE signal, it is determined whether the DVD-type optical disc 20 is a DVD-ROM, a DVD±R, or a DVD±RW (step S22). This determination may be achieved by previously preparing a threshold value and making comparison with this threshold value.

The determination of the optical disc 20 when the optical disc 20 is roughly classified as being of a DVD type in step S20 is as described above, but if it is judged not to be of a DVD type in step S20, the optical disc 20 is determined by procedures below.

Hereinafter, a description will be given, referring to FIG. 8. First, the light source 21 for a CD is turned on (step S23). Thereafter, the objective lens 22 is moved in a direction approaching the optical disc 20 (upward direction) (step S24). Moreover, simultaneously with the upward movement of the objective lens 22, acquisition of a PI signal and an FE signal is started (step S25).

Thereafter, it is checked if the objective lens 22 has moved to a predetermined position (step S26). Until the objective lens 22 moves to the predetermined position, the acquisition of the PI signal, etc. is continued. When the objective lens 22 has moved to the predetermined position, the movement of the objective lens 22 is stopped (step S27), and it is checked if the optical disc 20 inserted in the device is a CD-type optical disc 20 (step S28). This check may be achieved in the same manner as the procedures for roughly classifying whether the optical disc 20 is of a BD-type or a DVD-type.

In some cases, the optical disc 20 is of neither a BD type nor a DVD type; thus, even without performing checking, the optical disc 20 in the optical disc device 1 may be roughly classified as a CD-type optical disc 20.

In step S28, if it is judged that the optical disc 20 in the device is of a CD type, amplitude of the PI signal and the FE signal (that of a signal curve based on recording layer reflection of the CD) is acquired (step S29). The amplitude is obtained through processing by the DSP 7, and is transmitted to the system controller 12.

Then by using the acquired amplitude values of the PI signal and the FE signal, it is determined whether the CD-type optical disc 20 is a CD-ROM, a CD-R, or a CD-RW (step S30). This determination may be achieved by previously preparing a threshold value and making comparison with this threshold value. On the other hand, if it is judged in step S28 that the optical disc 20 in the device is not of a CD type, it is none of optical discs 20 of a BD-type, a DVD-type, and a CD-type capable of recording and reproduction in the optical disc device 1, and thus it is discharged out of the device (step S31).

In this embodiment, if the optical disc 20 is none of a BD-type, a DVD-type, and a CD-type, it is discharged out of the device, although its configuration is not limited thereto. For example, an error may be displayed on a display part (not shown).

With the method of determining the optical disc 20 of the optical disc device 1 indicated above, in the determination of the optical disc 20 by using the amplitude value of the PI signal, the amplitude of the PI signal is corrected by using the RF signal only when the optical disc 20 is determined to be of a BD-type. However, the configuration is not limited to this, and needless to say, the amplitude of the PI signal may be corrected by using the RF signal even in determination of the optical disc 20 roughly classified as being of a DVD-type or a CD-type. However, of the BD-type optical discs 20, optical discs, including a BD pigment change type (BD-R) and a BD phase change type (BD-RE), capable of recording have low reflectance, it is highly possible that the amplitude of the PI signal is erroneously recognized, and thus effect of correcting the amplitude of the PI signal is large in particular.

The invention is effective in determining the type of the optical disc 20 by using the amplitude of the PI signal, and is widely applicable even in cases where procedures other than the procedures of determining the optical disc described above are taken. For example, in the embodiment described above, after the rough classification of the optical disc 20, the type of the optical disc 20 is determined by using the amplitude of the PI signal and the FE signal. However, the invention is also applicable to a case where the type of the optical disc 20 is determined by using only the amplitude of the PI signal after the rough classification of the optical disc 20. Moreover, for example, the invention is also applicable to: for example, cases where: instead of determining optical discs of a BD-type, a DVD-type, and CD-type in this order, this order is changed to a different order; and the determination procedures for efficient determination of the type of the optical disc 20 is changed.

Moreover the embodiment described above is based on the assumption that the reflectance of the optical disc 20 drops when information has been recorded onto the optical disc 20. However, in some cases, the reflectance on the recording layer of the optical disc 20 improves when information has been recorded on the optical disc, in which case the invention is also applicable. That is, in this embodiment, level addition is performed to correct the amplitude of the PI signal; however, in the case described above, level subtraction may be performed to correct the amplitude of the PI signal.

This embodiment has been described concerning the determination of the optical disc in the optical disc device compatible with a BD-type, a DVD-type, and a CD-type. Needless to say, the invention is also widely applicable to an optical disc device compatible with other types of optical discs.

According to the optical disc device of the invention, the type of an optical disc can be appropriately determined even when an optical disc with low reflectance is included. Therefore, the invention is useful in the field of an optical disc device compatible with a plurality of types of optical discs.

What is claimed is:

1. An optical disc device comprising:
a light source;
an objective lens condensing on a recording layer of an optical disc an optical beam emitted from the light source;
an actuator displacing the objective lens in a direction approaching or separating from the optical disc;
an optical detection part receiving reflected light reflected by the optical disc;
a pull-in signal generation part generating a pull-in signal as a sum signal of the reflected light from an electrical signal detected by the optical detection part;
an RF signal generation part generating an RF signal as a reproduced signal from the electrical signal detected by the optical detection part; and
a control part causing processing of determining a type of the optical disc to be executed, wherein
the processing caused by the control part to be executed includes:
  signal acquisition processing moving the objective lens in the direction approaching the optical disc or in the direction separating from the optical disc to acquire the pull-in signal and the RF signal; and
  determination processing deciding, based on the RF signal acquired in the signal acquisition processing, whether or not to correct amplitude of the pull-in signal acquired in the signal acquisition processing, and then determining the type of the optical disc by using either of: the amplitude of the acquired pull-in signal and a correction value with which the amplitude of the acquired pull-in signal is corrected by using a predetermined value obtained from the acquired RF signal.

2. The optical disc device according to claim 1,
wherein the predetermined value obtained from the RF signal is a value obtained as a difference between a maximum value and a minimum value of the RF signal obtained by the signal acquisition processing.

3. The optical disc device according to claim 2,
wherein the processing caused by the control part to be executed includes rough classification processing of measuring time from when reflection on a surface of the optical disc is detected to when reflection on the recording layer is detected and then roughly classifying the type of the optical disc based on obtained time information, and
wherein the determination processing is executed after the rough classification processing.

4. The optical disc device according to claim 3,
wherein a focus error signal is further acquired in the signal acquisition processing, and
wherein the processing caused by the control part to be executed includes processing of determining the type of the optical disc based on amplitude of the focus error signal.

5. The optical disc device according to claim 4,
wherein the determination processing is used for determining at least a type of an optical disc of a blue-ray disc type.

6. The optical disc device according to claim 3,
wherein the determination processing is used for determining at least a type of an optical disc of a blue-ray disc type.

7. The optical disc device according to claim 2,
wherein a focus error signal is further acquired in the signal acquisition processing, and
wherein the processing caused by the control part to be executed includes processing of determining the type of the optical disc based on amplitude of the focus error signal.

8. The optical disc device according to claim 7,
wherein the determination processing is used for determining at least a type of an optical disc of a blue-ray disc type.

9. The optical disc device according to claim 2,
wherein the determination processing is used for determining at least a type of an optical disc of a blue-ray disc type.

10. The optical disc device according to claim 1,
wherein the processing caused by the control part to be executed includes rough classification processing of measuring time from when reflection on a surface of the optical disc is detected to when reflection on the recording layer is detected and then roughly classifying the type of the optical disc based on obtained time information, and
wherein the determination processing is executed after the rough classification processing.

11. The optical disc device according to claim 10,
wherein a focus error signal is further acquired in the signal acquisition processing, and
wherein the processing caused by the control part to be executed includes processing of determining the type of the optical disc based on amplitude of the focus error signal.

12. The optical disc device according to claim 11,
wherein the determination processing is used for determining at least a type of an optical disc of a blue-ray disc type.

13. The optical disc device according to claim 10,
wherein the determination processing is used for determining at least a type of an optical disc of a blue-ray disc type.

14. The optical disc device according to claim 1,
wherein a focus error signal is further acquired in the signal acquisition processing, and
wherein the processing caused by the control part to be executed includes processing of determining the type of the optical disc based on amplitude of the focus error signal.

15. The optical disc device according to claim 14,
wherein the determination processing is used for determining at least a type of an optical disc of a blue-ray disc type.

16. The optical disc device according to claim 1,
wherein the determination processing is used for determining at least a type of an optical disc of a blue-ray disc type.

17. A method of determining a type of an optical disc by using amplitude of a pull-in signal as a sum signal of reflected light from the optical disc, the method comprising the steps of:
  acquiring the pull-in signal and an RF signal as a reproduced signal by moving an objective lens in either of a direction approaching the optical disc and a direction separating from the optical disc;
  deciding, based on the acquired RF signal, whether or not to correct amplitude of the acquired pull-in signal; and
  determining the type of the optical disc by using either of the amplitude of the acquired pull-in signal and a correction value with which the amplitude of the acquired pull-in signal is corrected by using a predetermined value obtained from the acquired RF signal.

* * * * *